(12) United States Patent
Jaulent

(10) Patent No.: US 7,507,086 B2
(45) Date of Patent: Mar. 24, 2009

(54) GAS BURNER-TYPE COMBUSTION DEVICE AND METHOD FOR OPERATING SAME

(76) Inventor: Gérard Jaulent, 1475, chemin des Poulidets, Le Carrevrat, F-82000 Montauban (FR)

( * ) Notice: Subject to any disclaimer, the term of this patent is extended or adjusted under 35 U.S.C. 154(b) by 399 days.

(21) Appl. No.: 10/519,466

(22) PCT Filed: Jun. 27, 2003

(86) PCT No.: PCT/FR03/02003

§ 371 (c)(1),
(2), (4) Date: May 25, 2005

(87) PCT Pub. No.: WO2004/003432

PCT Pub. Date: Jan. 8, 2004

(65) Prior Publication Data

US 2005/0214705 A1  Sep. 29, 2005

(30) Foreign Application Priority Data

Jun. 27, 2002  (FR) .................................. 02 07983

(51) Int. Cl.
*F23C 5/06* (2006.01)
(52) U.S. Cl. .................. 431/186; 126/271.2 R; 126/271.1; 239/453; 239/458
(58) Field of Classification Search .......... 431/189, 431/186, 185, 181, 350, 354, 8, 9, 12, 159, 431/171; 126/271.1, 271.2 R, 271.2 B; 43/144; 37/227; 239/128, 146, 265, 265.27, 127.1, 239/588, 265.43, 453, 455, 458, 546; 404/77, 404/79; 280/473; 16/18 R
See application file for complete search history.

(56) References Cited

U.S. PATENT DOCUMENTS

| 2,081,710 A | * | 5/1937 | McDonald ................. 431/186 |
| 2,125,019 A | * | 7/1938 | Haynes ...................... 431/202 |
| 2,485,391 A | * | 10/1949 | Lasseigne et al. ..... 126/271.2 A |
| 2,526,748 A | | 10/1950 | Hill |
| 2,839,047 A | * | 6/1958 | Davisson et al. ...... 126/271.2 R |
| 2,851,092 A | * | 9/1958 | McKee ..................... 431/189 |
| 3,460,763 A | * | 8/1969 | Kopp ....................... 239/265.43 |
| 3,782,884 A | * | 1/1974 | Shumaker ................. 431/186 |
| 3,788,797 A | * | 1/1974 | Mayfield et al. ............ 431/186 |
| 4,050,879 A | * | 9/1977 | Takahashi et al. .......... 431/174 |
| 4,199,934 A | | 4/1980 | Meyer |

(Continued)

FOREIGN PATENT DOCUMENTS

DE  559 758 C  9/1932

(Continued)

*Primary Examiner*—Kenneth B Rinehart
*Assistant Examiner*—Andrew St Clair
(74) *Attorney, Agent, or Firm*—Akerman Senterfitt; Peter A. Chiabottti

(57) ABSTRACT

The present invention concerns a gas burner type combustion device called "burner" (B) projecting a mix of air and gas inflamed at the outlet of a pipe. The gas burner is fitted with a movable diffusion cone (200) whose tip (210) is located at least upstream from the flame creation zone so as to ensure the bursting of the air and gas mix, the relative displacement of the cone (200) according to the axis of diffusion defined by the flames allowing to adjust the strength of the latter.

11 Claims, 5 Drawing Sheets

U.S. PATENT DOCUMENTS

| | | | | |
|---|---|---|---|---|
| 4,925,387 A | * | 5/1990 | Locanetto et al. | 431/187 |
| 5,343,693 A | | 9/1994 | Komatsu | |
| 5,400,525 A | * | 3/1995 | Sheley | 34/360 |
| 5,682,707 A | * | 11/1997 | Chastain | 47/1.44 |
| 6,027,330 A | * | 2/2000 | Lifshits | 431/8 |
| 6,257,875 B1 | * | 7/2001 | Johnstone et al. | 431/345 |
| 6,578,779 B2 | * | 6/2003 | Dion | 239/700 |
| 7,175,423 B1 | * | 2/2007 | Pisano et al. | 431/10 |

FOREIGN PATENT DOCUMENTS

| | | |
|---|---|---|
| DE | 90 11 567 U | 10/1990 |
| DE | 299 21 977 | 4/2000 |
| EP | 1 186 234 A | 3/2002 |
| FR | 2 823 644 A | 10/2002 |
| GB | 1 594 435 A | 7/1981 |
| WO | WO 91 14363 A | 10/1991 |
| WO | WO 99 38378 A | 8/1999 |

* cited by examiner

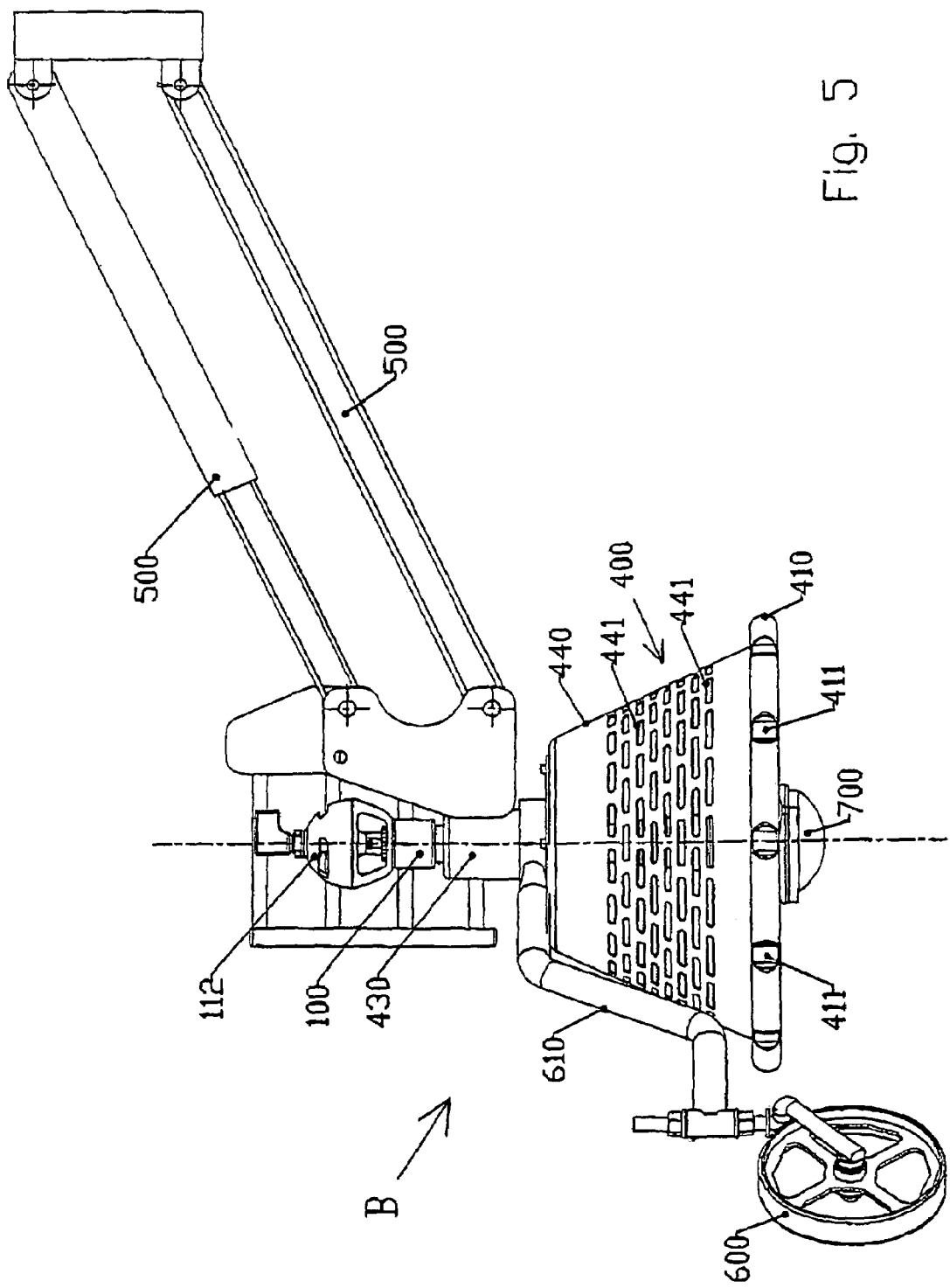

GAS BURNER-TYPE COMBUSTION DEVICE AND METHOD FOR OPERATING SAME

CROSS REFERENCE TO RELATED APPLICATION

This application is a national stage of PCT/FR2003/002003 filed Jun. 27, 2003 and is based upon French Patent Application No. 02/07983, filed Jun. 27, 2002 under the International Convention.

BACKGROUND OF THE INVENTION

1. Field of the Invention

The invention falls within the field of gas burner type combustion devices and more precisely to adaptations allowing to adjust the intensity and the form of the generated flame.

2. Related Art of the Invention

The applicant has noticed that various devices concerning the field of burners within the scope of thermal weed killing have inconveniences of which the main one are detailed below.

The gas burners disclosed in the French patents FR2752145, FR2792499 and FR2793415, constitute the basis of leaf-stripping and/or thermal disinfecting devices.

It would appear that these burners do not allow the actual and efficient working zone of the flames generated by the burner to be adjusted. Yet, proper thermal weed killing benefiting from a precise orientation and adjustment of the generated flames would be particularly efficient so as to avoid, on the one hand, any wasted use of gas and, on the other hand, a part of the vegetation being involuntarily subjected to said thermal treatment.

Likewise, the burners of the prior art are specifically configured for thermal weed killing of a type of vegetation or are used for a specific purpose and cannot be used for another purpose. Consequently, the thermal weed killing devices of the prior art do not have adjustable diffusers and classically equip their burners with a single nozzle creating a solitary shape. This lack of flexibility results in a wastage of energy as well as a restriction in the possible applications of said burners.

Another inconvenience that the applicant has noticed lies in the fact that the thermal weed killing devices of the prior art do not take into account the density of the weeds or vegetation to be killed and only offer a constant flux of gas despite variations in density.

The prior art also comprises more standard gas burners non-specific to thermal weed killing such as that disclosed in the U.S. Pat. No. 2,526,748 which proposes a burner with a conical orifice the inside of which is fitted with a flame diffusion cone as well as a guiding cone for the flames, said cones being of a set shape.

Such burners have the inconvenience of separating the gas and the air until their inflammation which results in a poor output. The diffusion cone bursts the flux of gas whereas the guiding cone bursts the air so as to lead it to the outlet of the gas spray nozzle. However, the air is not projected out of the cones. Moreover, the cones constituting the burners have the same conical shape which does not contribute to acceleration or a jet effect needed for a good projection of the flames.

SUMMARY OF THE INVENTION

Based on the above facts, the applicant has carried out research aimed at overcoming the lack of flexibility of the burner type combustion devices of the prior art.

The research resulted in the designing of a particularly novel gas burner type combustion device that can be used for other applications than just thermal weed killing and allowing to overcome the inconveniences of the devices of the prior art and proposing to adjust, not only the working area of the flames generated by the burner, but also the strength of the flames.

According to the invention, the gas burner type combustion device called "burner" projecting a mix of air and gas inflamed at the outlet of a pipe is remarkable in that it is fitted with a movable diffusion cone whose tip is located at least upstream from the flame creation zone so as to ensure the bursting of the air and gas mix, the relative displacement of the cone according to the axis of diffusion defined by the flames allowing to adjust the strength of the latter.

Thus, the bursting of the flux being produced even though the mix is not as yet inflamed, that being on the inside of the burner, this operation not being subject to the uncertainties of the external environment which could be particularly awkward if the flame were to be burst at the outlet of the burner.

Moreover, by playing with the gap between the external surface of the cone and the internal surface of the pipe outlet, the device related to the invention is particularly advantageous in that it creates an effect called "Venturi" provoking the acceleration of the air/gas mix and therefore an increase in the strength of the flames. Consequently, the device related to the invention allows to adjust the strength of the burner by actuating the diffusion cone.

The use of a cone also has the advantage of guaranteeing a good distribution of the mix and consequently of the produced flame.

Contrary to the burner disclosed in the American document U.S. Pat. No. 2,526,748, the device related to the invention bursts the mix made of the gas and the air, not the gas and the air separately. Thus, the cone moves in the bursting zone of the flux of the mix on the inside of the burner whereas the relative mobility of the cones disclosed in said American document only allowed movement on the flux of gas.

According to another particularly advantageous feature of the invention, said cone deploys or retracts so that the diameter of the base of said cone changes during the operating of the burner according to the usage of the burner so that the flame takes on the deployed or retracted shape of the cone whilst in operation.

This feature resolves the inconveniences of the devices of the prior art which lacked precision and flexibility. Indeed, the controlled variation of the base of the diffusion cone allows to adjust the shape of the flame and consequently the efficient working zone of the flames.

The conjugated adjustment of the strength and shape of the flame resolves the flexibility problems associated with the devices of the prior art and allows for a plurality of applications to be envisaged for the device related to the invention. Thus, within the context of a gas stove which usually has several different sizes of burners, the possibility of adjusting the burner related to the invention allows for a single burner to be envisaged ensuring the strength and distribution ensured by the plurality of burners.

Another purpose of the invention is the method of operating such a gas burner type device whose operation within the scope of a thermal weed killing type application is associated with the detection and with the calculation of the density of the foliar spectrum.

Thus, according to a particularly advantageous feature of the invention, the method of operating the device is remarkable in that it consists in increasing or reducing the strength or shape of the flames via respectively displacing or opening and closing the cone according to the increase or reduction in the detected foliar spectrum.

This feature is particularly advantageous in that it guarantees an optimised management of the consumption of the gas and therefore allows to save on it as and when possible.

The fundamental concepts of the invention having just been described, other features and advantages will appear in greater detail upon reading the following description and in reference to the annexed drawings of an embodiment of a gas burner type device according to the invention.

BRIEF DESCRIPTION OF THE DRAWINGS

FIG. 5 is a diagrammatic side view illustrating another embodiment of the device related to the invention installed in real conditions.

DETAILED DESCRIPTION OF THE INVENTION

Figure 1:
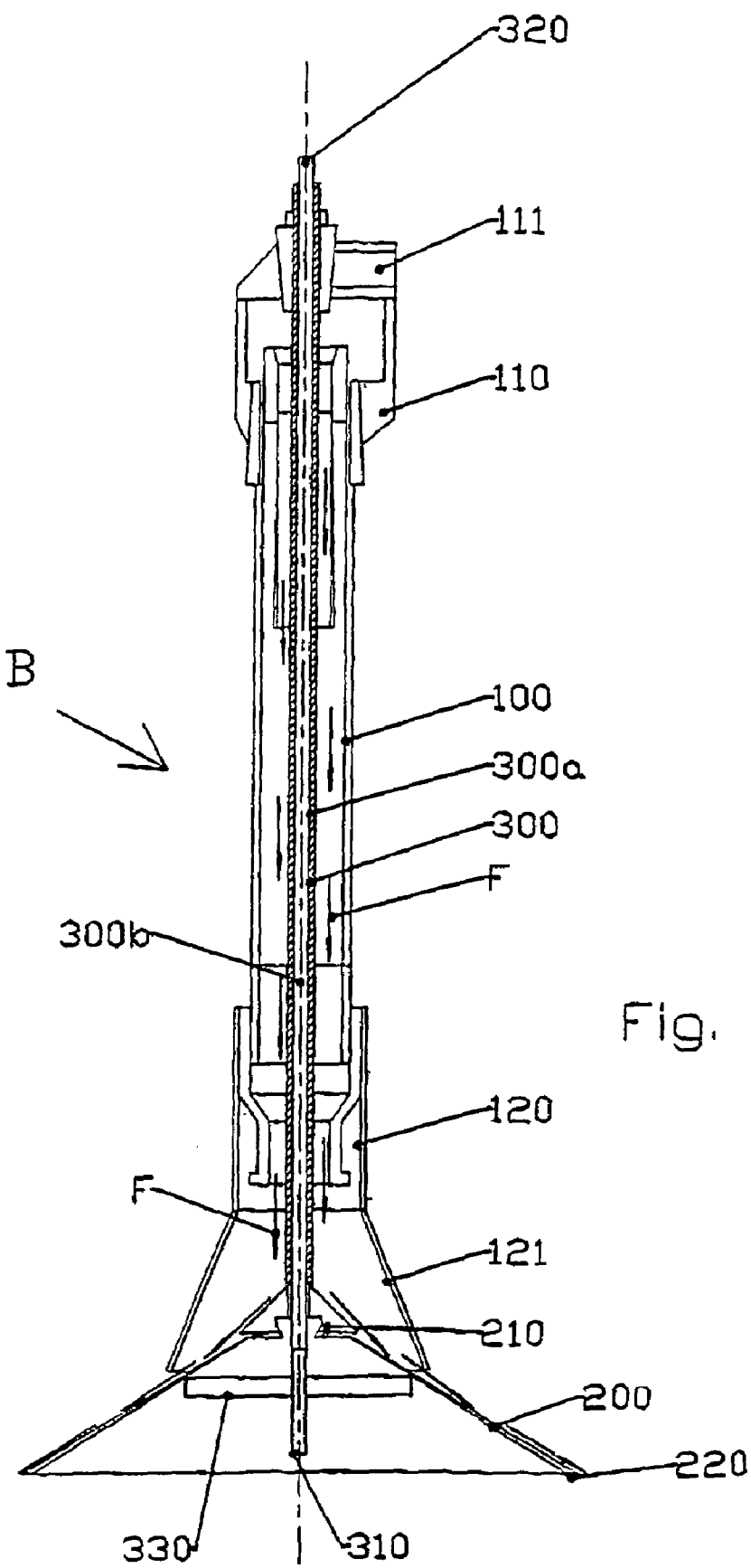
FIG. 1 is a cross section of an embodiment of a burner according to the invention.

As illustrated in FIG. 1, the gas burner type device called "burner" marked B comprises as a whole unit a cylindrical hollow body 100, whose upper end 110 is fitted with a gas inlet in the form of a coupling 111 and whose lower end 120 opens out to allow the inflamed gas and air mix to escape. The path the gas takes is symbolised by the arrow F.

According to the invention, the burner B comprises a diffusion cone 200 whose tip 210 is located upstream from the flame creation zone so as to ensure the bursting of the, not as yet inflamed, air and gas mix. Thus, the flux of the gas and the air is burst on the inside of the burner B so that this operation is not hindered by the external constraints thus guaranteeing a good distribution of the flames.

According to the invention, this cone 200 is movable and co-operates with a fixed nozzle tip 121 equipping the lower end 120 of the burner B equipped with the diffusion cone participating in the diffusion of the flames so that the desired Venturi effect is adjustable according to the increase or decrease in the gap between the external surface of the cone 200 and the internal surface of the nozzle tip 121. The variation in the position of the cone 200 thus permits the variation in strength of the flames. This adjusting of the strength of the flux of the mix and therefore of the jet of flames is optimised due to the fixed nozzle tip 121 and the diffusion cone taking a different conical shape or a different slope. This burner B also has the specificity of ensuring a bursting of the jet of gas before it exits the nozzle tip created by the fixed cone created by the nozzle tip 121 and therefore before becoming inflamed. Once the flux of gas distributed over the periphery of the cone 200 has reached the outside the latter is inflamed.

According to another particularly advantageous feature of the invention, the shape of the generated flames is also adjustable. Indeed, the cone 200 having the purpose of bursting the flux of gas projected through the main body 100 and thus allowing to distribute the flames over the external periphery of the diffuser cone 200, also allows a change in the base defining the angle of slope of the diffusion cone thus adjusting the size of the diffusion zone of said flames.

The diameter of the base 220 of said cone 200 is adjustable during the operating of the burner B according to the usage of the burner B. This cone 200 not only ensures a good distribution of the flux of flames created through bursting the flux of gas at the right point but it also allows to adjust the amplitude of this distribution.

Figure 3A:
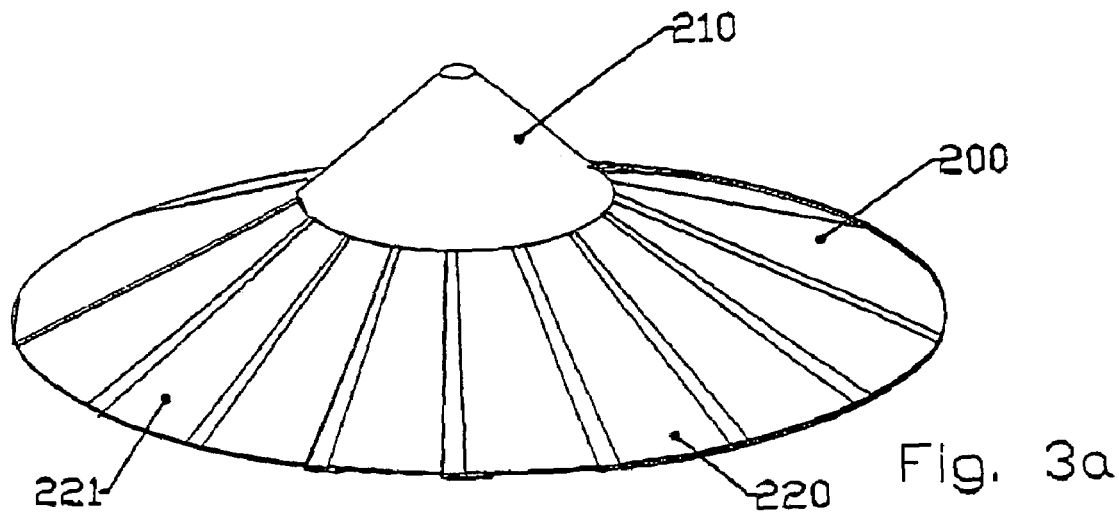
FIGS. 3a and 3b are detailed, diagrammatic perspective views of the diffusion cone only.
Figure 3B:
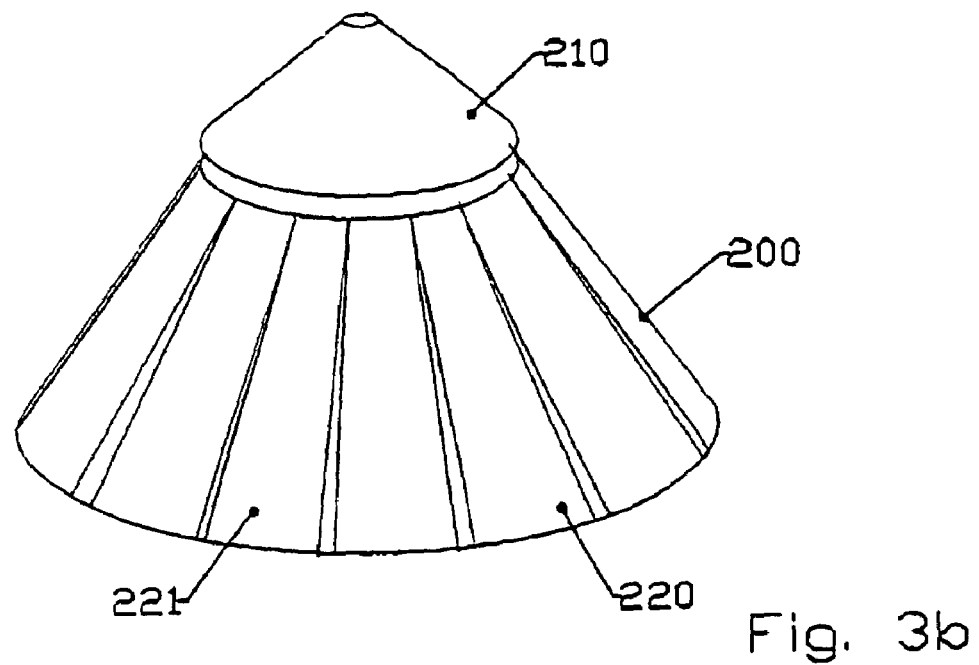

Thus as illustrated in FIGS. 3a and 3b, said cone 200 is constituted in a tip 210 and a lower part 220 comprised of a plurality of blades 221, in this case independent of each other, articulated in relation to the tip so as to move from a deployed position as illustrated in FIG. 3a to a retracted position as illustrated in FIG. 3b and vice versa, thus changing the diameter of the base of the diffusion cone 200.

According to a particularly advantageous embodiment, the blades 221 constituting the lower part are articulated on the upper fixed part so as to tend to retract said cone 200. According to a particularly judicious technological option these blades 221 tend to retract the cone 200 by means of their weight.

In order to avoid a loss of flames between the blades when the latter forming the lower part of the cone move apart so as to deploy, said blades 221 have dimensions such and are placed in such a way that their sides overlap, one blade 221 over the other irrespective of their position so that even in the deployed position the latter do not leave any gaps between them. To accomplish this according to the illustrated embodiment, each blade 221 takes on the shape of a trapeze of which one of the non-parallel sides is pre-formed so as to be covered or to cover the non-parallel side of the trapeze created by the adjacent blade 221.

The implementing of this variation in the diameter of the base of the diffusion cone was carefully considered by the applicant as the latter should be capable of being made during the operating of the burner so as to adjust the shape of the flame created as per the needs of the burner B users'.

According to the invention, the opening and closing of the cone 200 as well as its relative displacement in relation to the body 100 of the burner B are actuated by the relative controlled displacements of at least one control rod 300. As illustrated, this rod 300 is placed on the inside of the body 100 of the burner B and overhangs the ends of said body 100. One of the ends marked 310 of said control rod 300 is connected to said cone 200.

As illustrated, the burner B comprises a spacer 330 located on the inside of the cone 200 and constantly touching said blades 221, said spacer 330 being connected to said control rod 300 whose actuation ensures the displacement of said spacer so that when the rod 300 is actuated by means of, for example, its other end 320, it displaces said spacer 310 and consequently ensures the deployment or retraction of said blades 221.

According to a preferred but non-restrictive embodiment, said spacer 330 is in helical connection with said control rod 300 whose rotation ensures the displacement of said spacer 330 and consequently the deployment or retraction of the cone 200 according to the direction of rotation.

Figure 2C:
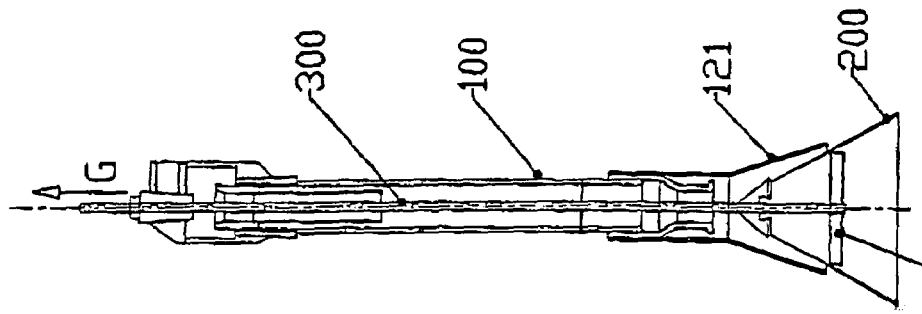
FIGS. 2a, 2b and 2c are cross section views of the embodiment in FIG. 1, illustrating several positions of the diffusion cone.
Figure 2B:
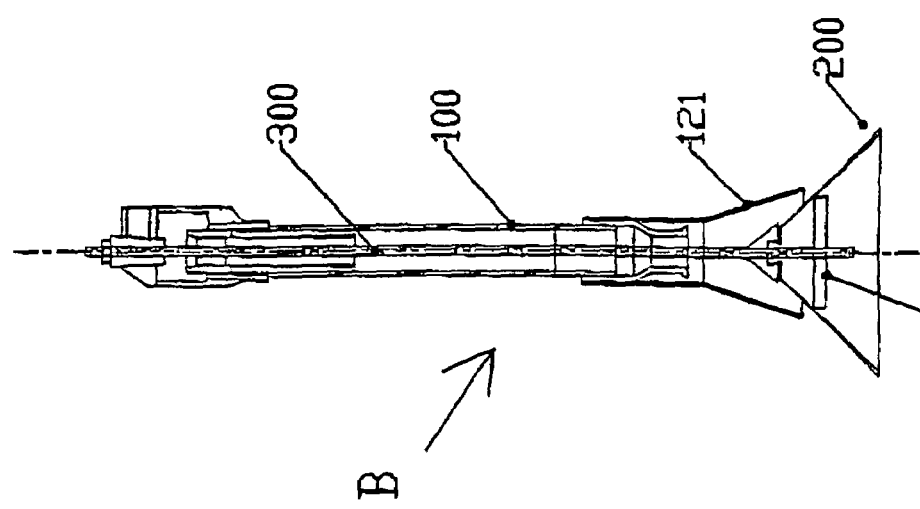
Figure 2A:
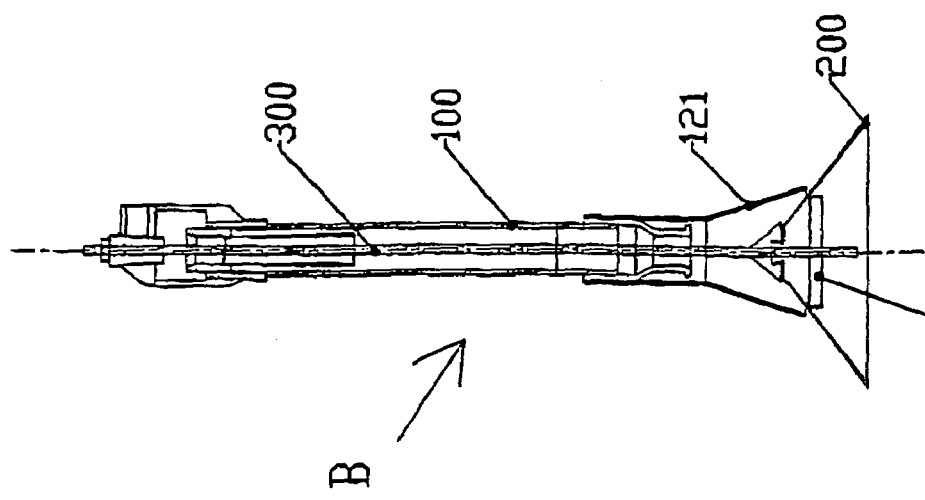

Using of a helical connection allows to precisely adjust the shape of the generated flame. According to a preferred embodiment, the helical connection is made via a micrometer screw. Thus, by any means likely to rotate the end of the rod 320, it is possible to vary, according to the needs of the application, the size and shape of the diffusion cone as illustrated in FIGS. 2a, 2b and 2c. Further the spacer 330 is from the tip of the cone 200, under the rotating effect of rod 300, greater is the extent to which the blades 221 retract and close the cone 200 up as illustrated in FIG. 2c. On the contrary, when the rod 300 turns in the other direction, the spacer 330 closes in on the tip of the cone 200 and moves the blades 221 apart so as to deploy the cone 200 to its maximum and provide the diffusion zone of the flame with the biggest possible surface. FIG. 2c further illustrates a position in which, to compensate for too great a space created by the retraction of the blades 221 between the cone 200 and the nozzle tip 121, the cone is placed upstream from the gas and air mix according to a straight line movement illustrated by the arrow G thus guaranteeing the preservation of the Venturi effect.

This very precise adjusting of the shape of the flame overcomes the inconveniences of the prior art by offering the appropriate response surface for the concerned application without the wasted use of gas and without damaging the vegetation.

In order to conciliate the rotational movement needed to displace said spacer 330 with the straight line movement needed to displace the cone 200 at the end of the body 100 of the burner B, said control rod 300 divides into two equal rods 300a and 300b, the first one 300a being articulated for a straight line movement in relation to the body 100 and the second one being articulated for a rotational movement in relation to the first one. According to the illustrated, non-restricted embodiment, the rod 300b is swivel mounted on the inside of the rod 300a which is tubular, the rod 300a being in helical connected with said spacer 330.

According to another embodiment, not illustrated, the blades 221 are held in contact with the spacer 330 by means of a spring on the periphery of the cone which tends to push back said blades 220 towards the axis of the cone 200.

The applicant advantageously imagined a gas supply for a thermal weed killing application controlled in co-operation with a means for detecting and evaluating the foliar spectrum passing under the burner B. Thus, the device proposes to adjust the shape of the flame as well as the strength of the latter, new possibilities incorporated by the burner related to the invention, according to the obtained information. This co-operation can easily be ensured by means of an automaton. The applicant also advantageously imagined that this automaton could adjust by means of actuators, the supply of air to the burner B. Of course, the different movements needed to adjust the position and the shape of the cone could also be done manually.

Figure 4:
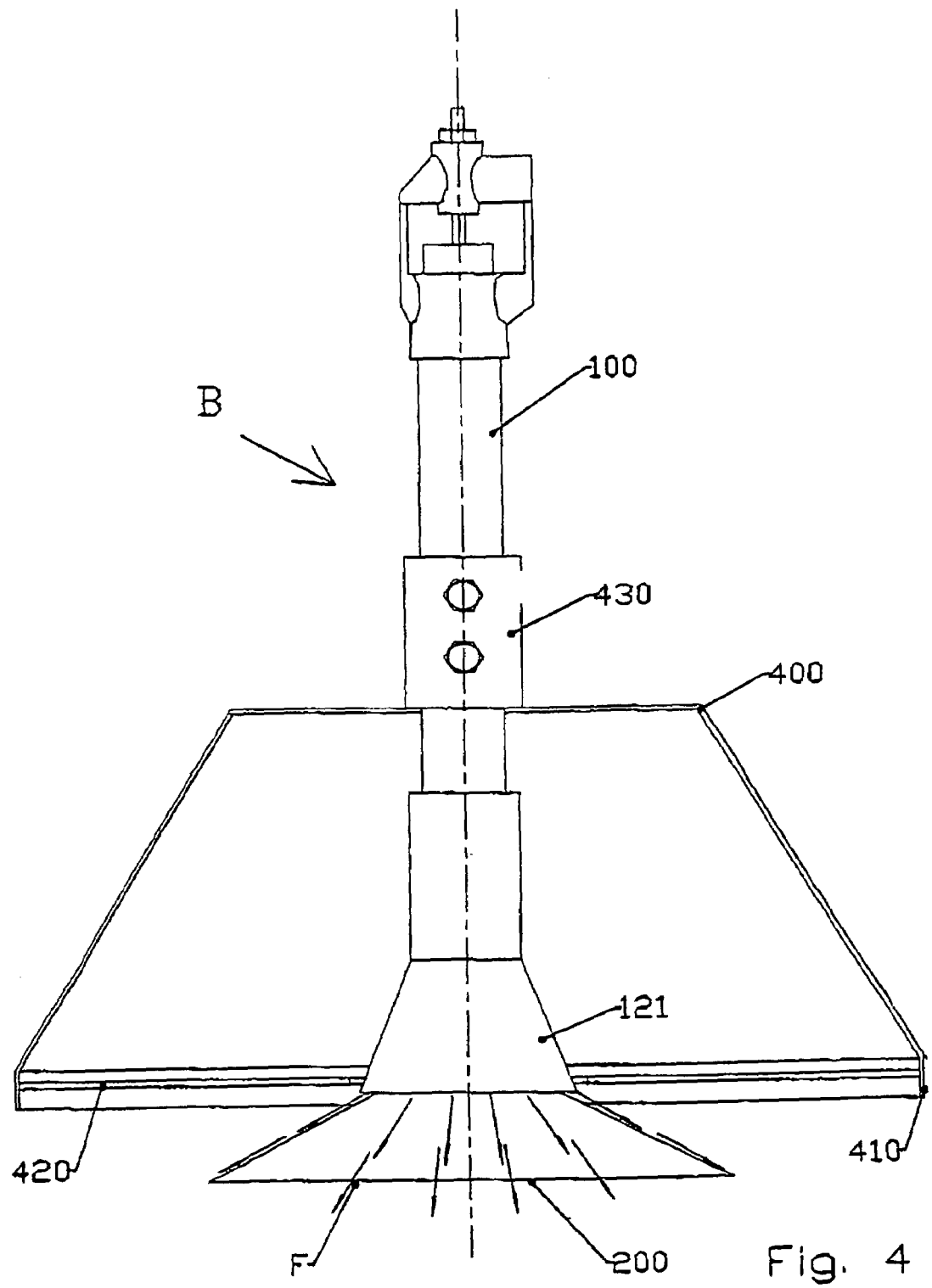
FIG. 4 is a diagrammatic view of an embodiment of the device related to the invention fitted with an accessory element, presented in a cross section view.

Still within the scope of a thermal weed killing application, the burner B is, as illustrated in FIG. 4, advantageously associated with a bell cover 400 which, being coaxial to the axis of diffusion of the flames, is constituted by the external cylindrical surfaces 410 with the purpose of maintaining a safety perimeter around the burner and by the substantially horizontal surfaces 420 maintaining the hot air above the contact point of the ground with the flames. As illustrated, said bell cover 400 is equipped with a shaft 430, the height of the fitting of the body 100 of the burner B may be adjusted to enable adjusting of the plate 420.

According to a particularly advantageous feature of the invention, said bell cover 400 is rotary mounted in a moveable manner in relation to the body 100 of the burner B along the axis, in this case vertical, of the burner B allowing it to produce less resistance when the latter touches the stem of a plant or a tree trunk. Thus, the shaft 430 creates a swivel connection with the body of the burner B. As illustrated in FIG. 5, in order to facilitate this rotation, the bell cover 400 is equipped, on its greatest diameter on said external cylindrical surfaces 410, with notches 411 aiding the rotation of the bell cover 400 and not its sliding when the latter touches the plant.

This bell cover therefore has the advantage of preventing the burner coming into contact with the plants around which is to be weeded, notably when the latter is associated with a thermal weed killing device by means of movable arms 500 such as those illustrated in FIG. 5. This bell cover 400 also has the purpose of guaranteeing the correct diffusion of the flames on the cone 200 by protecting the flux of flames. It also guarantees the presence of a circle of fresh air protecting the plants by restricting the high-temperature zone.

As illustrated in FIG. 5, one of the two arms 500 is preformed in order to be able to adjust the length thus ensuring the swivel movement of the axis of the burner in relation to the vertical.

According to another particularly advantageous feature of the invention illustrated in FIG. 5, said bell cover 400 and therefore the burner B are associated to at least one wheel 600 by means of an arm 610 itself swivelling at least around the axis, in this case vertical, defined by the burner B and around which swivels the bell cover 400. This wheel 600 guarantees a constant height of the burner B in relation to the ground, a particularly major feature in the context of thermal weed killing. Nonetheless, in order to avoid accidents due for example to the presence of clumps, the burner B comprises a protector 700, on its lower part, in contact with the ground constituted of a spherical surface preventing the burner and its fragile components coming into contact with the ground.

As illustrated in FIG. 5, the skirt 440 of the bell cover 400 is pierced with little orifices 441 so that air can pass through whilst protecting the fragile components of the burner B. Another feature of the device facilitating the supply of air and illustrated in FIG. 5, bears on the fact that the upper end 110 of the body 100 of the burner B is constituted of a sphere 112 which, comprising openings to allow at least the injection of gas and the intake of air, have an external shape minimising the obstacles for the leaves or branches as the burner progresses forward and an internal shape maximising the intake of air so as to optimise the efficiency of the burner B.

We understand that the gas burner type device and its method of operating were described and represented above with the purpose of disclosing rather than restricting. Of course, various adjustments, modifications and improvements can be made to the above example, without leaving the scope of the invention such as is defined in the claims.

Thus, for example, according to a non-illustrative feature, the burner is articulated at the arms in order to move from one substantially vertical position as illustrated to a more inclined or even horizontal position so as to be able to weed on an inclined or vertical plane.

What is claimed is:

1. A gas weed killing burner device, comprising:
   a main body (100) having an upper end (110) fitted with a gas inlet coupling (111) and a lower end (120) which opens out to allow an inflamed gas and air mix to escape to create a flame;
   a movable diffusion cone (200) located at the lower end (120), the diffusion cone (200) having a tip (210) located at least upstream from a flame creation zone to ensure the bursting of the air and gas mix;
   a fixed nozzle (121) located at the lower end (120) of the burner (B);
   a bell cover (400) coaxial to an axis of diffusion of the flame, the bell cover (400) being rotatably mounted to the fixed nozzle (121) such that the bell cover (400) is rotatable around a vertical axis of the burner (B); and
   wherein actuating a control rod (300) deploys or retracts the movable diffusion cone (200) so that the diameter of the base of the movable diffusion cone (200) changes during the operating of the burner (B) according to the usage of the burner (B) so that the flame takes on the deployed or retracted shape of the movable diffusion cone (200) whilst in operation.

2. The device according to claim 1, wherein the movable diffusion cone (200) further comprises a lower part (220), wherein the lower part includes a plurality of blades (221) articulated in relation to the tip so as to move from a deployed position to a retracted position and vice versa.

3. The device according to claim 1, wherein the control rod (300) extends along the main body (100) and into an approximate center of the tip (210) of the moveable diffusion cone (200), the control rod (300) having a spacer (330) in contact with the movable diffusion cone (200).

4. The device according to claim 3, wherein the control rod (300) includes a first rod (300a) displaceable along a longitudinal axis of the main body (100) for displacing the movable diffusion cone (200) and a second rod (300b) rotatably mounted to the first rod (300a) for displacing the spacer (330).

5. The device according to claim 2, wherein the blades (221) overlap, one blade over the other irrespective of their position.

6. The device according to claim 1, wherein the movable diffusion cone (200) co-operates with the fixed nozzle tip (121).

7. The device according to claim 1, wherein the bell cover (400) is constituted by an external cylindrical surface (410) with the purpose of maintaining a safety perimeter around the burner (B) and by a horizontal surface (420) to maintain the hot air above the contact point of the ground with the flames.

8. The device according to claim 1 of the type used for thermal weed killing, wherein the burner (B) is associated to at least one wheel (600) by means of an arm (610) itself swiveling at least around the vertical axis defined by the burner (B).

9. The device according to claim 1 of the type used for thermal weed killing, wherein the burner (B) further comprises a protector (700) located at the lower end.

10. The device according to claim 6, wherein the fixed nozzle tip (121) and the diffusion cone take a different conical shape or a different slope.

11. The device according to claim 6, wherein the upper end (110) of the body (100) of the burner (B) is constituted by an at least partially spherical member (112) which comprises openings to allow at least the injection of gas and the intake of air.

* * * * *